United States Patent [19]

Hayes et al.

[11] Patent Number: 4,972,014
[45] Date of Patent: Nov. 20, 1990

[54] POLYACETAL COMPOSITIONS CONTAINING A NON-MELTABLE POLYMER STABILIZER IMPROVED WITH AT LEAST ONE AMIDE-CONTAINING PHENOLIC ANTIOXIDANT

[75] Inventors: Richard A. Hayes, Parkersburg; Leonard E. R. Kosinski, Washington, both of W. Va.; Mark E. Wagman, Wilmington, Del.

[73] Assignee: E. I. du Pont de Nemours and Company, Wilmington, Del.

[21] Appl. No.: 366,850

[22] Filed: Jun. 15, 1989

[51] Int. Cl.$^5$ ................................. C08K 5/20
[52] U.S. Cl. .................... 524/219; 524/101; 524/291; 524/255
[58] Field of Search ............................ 524/219

[56] References Cited

U.S. PATENT DOCUMENTS

| | | | |
|---|---|---|---|
| 3,204,014 | 8/1965 | Green | 260/895 |
| 3,210,322 | 10/1965 | Polly et al. | 260/45.95 |
| 3,215,671 | 11/1965 | Melby | 260/67 |
| 3,219,727 | 11/1965 | Kray et al. | 260/874 |
| 3,235,531 | 2/1966 | Walker | 260/45.95 |
| 3,236,929 | 2/1966 | Jupa et al. | 264/328 |
| 3,281,499 | 10/1966 | Dolce et al. | 260/874 |
| 3,338,872 | 8/1967 | Kiss et al. | 260/72 |
| 3,366,561 | 1/1968 | Marans | 204/159.21 |
| 3,418,280 | 12/1968 | Orgen | 260/67 |
| 3,470,135 | 9/1969 | Ishida | 260/67 |
| 3,518,326 | 6/1970 | Forsberg | 260/828 |
| 4,098,843 | 7/1978 | Johnson | 260/857 F |
| 4,145,556 | 3/1979 | Hirsch et al. | 524/219 |
| 4,230,606 | 10/1980 | Amann et al. | 260/6 |
| 4,464,435 | 8/1984 | Hattori et al. | 428/409 |
| 4,522,735 | 6/1985 | Chasar | 252/49.9 |
| 4,555,357 | 11/1985 | Kausqa et al. | 252/511 |
| 4,596,847 | 6/1986 | Kausqa et al. | 524/220 |
| 4,640,949 | 2/1987 | Wagman | 524/227 |
| 4,657,970 | 4/1987 | Shiraki et al. | 525/57 |
| 4,657,971 | 4/1987 | Shiraki et al. | 525/57 |
| 4,766,168 | 8/1988 | West | 524/377 |
| 4,814,397 | 3/1989 | Novak | 525/154 |

FOREIGN PATENT DOCUMENTS

| | | |
|---|---|---|
| 37-15117 | 12/1987 | Fed. Rep. of Germany . |
| 42-7107 | 9/1967 | Japan . |
| 43-14329 | 6/1968 | Japan . |
| 59-213752 | 12/1984 | Japan . |

*Primary Examiner*—Veronica P. Hoke

[57] ABSTRACT

Incorporation into polyacetal molding compositions stabilized with a non-meltable polymer stabilizer of 0.02–1.0 weight percent of at least one amide-containing phenolic antioxidant results in significantly improved long term stability, as evidenced by greater retention of physical properties over time, of such compositions.

12 Claims, No Drawings 4,972,014

POLYACETAL COMPOSITIONS CONTAINING A NON-MELTABLE POLYMER STABILIZER IMPROVED WITH AT LEAST ONE AMIDE-CONTAINING PHENOLIC ANTIOXIDANT

BACKGROUND

TECHNICAL FIELD

This invention relates to improving the long term stability of certain polyacetal compositions containing at least one non-meltable polymer stabilizer. A significant improvement in the long term stability of polyacetal compositions containing at least one non-meltable polymer stabilizer is found to occur when there is present at least one amide-containing phenolic antioxidant. Non-amide-containing phenolic antioxidants do not impart an improvement of equal magnitude to the long term stability of said compositions.

Polyacetal compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Polyacetal compositions containing a non-meltable polymer stabilizer possess excellent stability during processing. Compositions based on polyacetals of relatively high number average molecular weight, e.g., 10,000 to 100,000, which contain a non-meltable polymer stabilizer, are useful in preparing semi-finished and finished articles by any of the techniques commonly used with thermoplastic materials, e.g., compression molding, injection molding, extrusion, blow molding, rotational molding, melt spinning, stamping and thermoforming. Finished articles made from such compositions possess desirable physical properties, including high stiffness, strength, low coefficient of friction, and good solvent resistance. However, the physical properties of the polyacetal composition containing the non-meltable polymer stabilizer may decrease with time. It is therefore an object of the present invention to improve upon the long term stability (i.e., improve upon the long term retention of physical properties) of a polyacetal composition containing at least one non-meltable polymer stabilizer. Such an improvement is achieved through incorporation into the composition of at least one amide-containing phenolic antioxidant in the composition.

The compositions of the present invention are useful wherever enhanced stability, both during and after processing, is desired.

SUMMARY OF THE INVENTION

This invention relates to polyacetal compositions containing a non-meltable polymer stabilizer, for processing stability, that are characterized as having improved long term stability. Specifically, the compositions of the present invention consist essentially of 0.05–3.0 weight percent of a non-meltable polymer stabilizer, 0.02–1.0 weight percent of at least one amide-containing phenolic antioxidant, and 96.0–99.9 weight percent of a polyacetal, with the above weight percents being based upon the weight of the polyacetal, the non-meltable polymer stabilizer, and the amide-containing phenolic antioxidant. The non-meltable polymer stabilizer contains formaldehyde reactive hydroxyl groups and/or formaldehyde reactive nitrogen groups, has a number average particle size, in the polyacetal, of less than ten microns, is non-meltable, and is used to provide processing stability to the composition.

Although the non-meltable polymer stabilized polyacetal compositions possess excellent stability during processing, these compositions can experience a loss of physical properties over time upon exposure to air. The invention herein relates to the discovery that amide-containing phenolic antioxidants impart improved long term stability to the polyacetal composition and prevent a significant loss of physical properties over time. The amide-containing phenolic antioxidants impart improvements to the long term stability of the non-meltable polymer stabilized polyacetal compositions that are of a greater magnitude than are the improvements obtained with non-amide-containing phenolic antioxidants. The long term stability of the polyacetal composition containing the non-meltable polymer stabilizer is also significantly improved when there is added a mixture of antioxidants to the composition, provided that said mixture includes at least one amide-containing phenolic antioxidant and that the amide-containing phenolic antioxidant constitutes 0.02–1.0 weight percent of the composition.

DETAILED DESCRIPTION OF THE INVENTION

This invention relates to improving the long term stability of polyacetal compositions containing a non-meltable polymer stabilizer. Polyacetal compositions containing non-meltable polymer stabilizers have been found to possess excellent processing stability. However, said compositions may undergo loss of physical properties over time upon exposure to air. Due to the excellent processing stability that these compositions possess, it is highly desirous to use these compositions in commercial applications. As such, it is also desirous to improve upon the long term stability, or the retention of properties over time, for these non-meltable polymer stabilized polyacetal compositions.

In the present invention, it has been found that a particular antioxidant will significantly improve upon the long term stability, as evidenced by the long term retention of properties, of polyacetal compositions containing a non-meltable polymer stabilizer. It is important to note that while antioxidants are known to provide enhanced stability to many compositions, they are not always readily transferable from one polyacetal composition to another. The effectiveness of an antioxidant can be dependent upon several variables, such as, for example, the particular base polymer in the composition and the particular stabilizer in the composition. Further, interactions can occur between the antioxidant and the stabilizer, or any other component in the composition, that can limit the effectiveness of the antioxidant or that will result in a composition with unacceptable properties.

In the present invention, it has been found that the antioxidant that is most effective in improving the long term stability of polyacetal compositions containing at least one non-meltable polymer stabilizer is an amide-containing phenolic antioxidant. When the non-meltable polymer stabilized polyacetal composition contains at least one amide-containing phenolic antioxidant, the composition retains its overall physical properties to a much greater and more significant extent than it does when there is no antioxidant present or the antioxidant added is a non-amide-containing phenolic antioxidant.

The polyacetal

The term "polyacetal" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

The polyacetals used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a Du Pont PSM bimodal column kit with nominal pore size of 60 and 1000 A. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer, or a mixture thereof. Copolymers can contain one or more comonomers, such as those generally used in preparing polyacetal compositions. Comonomers more commonly used include alkylene oxides of 2–12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness and strength. Preferred polyacetal homopolymers include those whose terminal hydroxyl groups have been end-capped by a chemical reaction to form ester or ether groups, preferably acetate or methoxy groups, respectively.

The non-meltable polymer stabilizer

The non-meltable polymer stabilizer used in the compositions of the present invention is a homopolymer or copolymer containing formaldehyde reactive nitrogen groups, formaldehyde reactive hydroxyl groups, or both formaldehyde reactive nitrogen and formaldehyde reactive hydroxyl groups. By "formaldehyde reactive" it is meant that the hydroxyl group contains an oxygen with a hydrogen atom bonded to it and the nitrogen group contains a nitrogen with one or two hydrogen atoms bonded to it. Formaldehyde will react with the -OH or the -NH bonds of the non-meltable polymer stabilizer. These reactive sites are referred to herein as formaldehyde reactive sites. It is preferred that the non-meltable polymer stabilizer contain formaldehyde reactive nitrogen or hydroxyl groups having the maximum number of formaldehyde reactive sites. For example, a non-meltable polymer stabilizer containing formaldehyde reactive nitrogen groups wherein there are two hydrogen atoms attached directly to the nitrogen atom (i.e., two formaldehyde reactive sites in the group) is preferred over one containing formaldehyde reactive nitrogen groups wherein there is only one hydrogen atom attached directly to the nitrogen atom (i.e., one formaldehyde reactive site in the group).

The non-meltable polymer stabilizer has at least ten repeat units. It preferably has a weight average molecular weight of greater than 5,000, most preferably greater than 10,000. Higher weight average molecular weights are most preferred and further, such higher weight average molecular weights may be advantageous for reducing mold deposit formation.

The non-meltable polymer stabilizer is further non-meltable at the temperature at which the polyacetal is melt processed. By the term "non-meltable", it is meant that the non-meltable polymer stabilizer has its "major melting point" above the temperature at which the polyacetal is melt processed and thus remains essentially a solid during melt processing of the polyacetal. Alternatively, a non-meltable polymer stabilizer is "non-meltable" if the non-meltable polymer stabilizer has its "major melting point" below the temperature at which the polyacetal is melt processed but, it does not undergo significant melt flow at that temperature. The melt flow rate of the non-meltable polymer stabilizer may not be significant because the non-meltable polymer stabilizer has a high viscosity, attributed to, for example, high molecular weight or crosslinking.

In the case where the non-meltable polymer stabilizer has its "major melting point" below the temperature at which the polyacetal is melt processed, the melt flow rate of the non-meltable polymer stabilizer, as measured in accordance with ASTM-D 1238, is preferably less than one-tenth that of the polyacetal. The "major melting point" of the non-meltable polymer stabilizer can be determined on a differential scanning calorimeter. "Major melting point" is the temperature at which the amount of heat absorbed, by the non-meltable polymer stabilizer, is greatest; i.e., it is the temperature at which the polymer stabilizer shows the greatest endotherm. As an example of how to measure melt flow rate, and in accordance with ASTM-D 1238, the melt flow rate should be measured at 200° C. under a load of 2.16 kilograms. The non-meltable polymer stabilizer should be dried at about 90° C. for about 12 hours prior to measuring the melt flow rate. The non-meltable polymer stabilizer should then be loaded into the plugged melt indexer and heated to test temperature over a six minute time period, after which time the plug is released. The melt flow rate is determined over three minute intervals. The technique for measuring melt flow rate is further discussed below, after the disclosure relating to the preparation of the non-meltable polymer stabilizer.

The major melting point of the non-meltable polymer stabilizer can, for example, be determined on a DUPONT Model 9900 DIFFERENTIAL SCANNING CALORIMETER (DSC) in a nitrogen atmosphere. To eliminate the possible effect of small amounts of moisture or solvents, each non-meltable polymer stabilizer should be first heated to about 140° C. and held there for about 10 minutes. The samples should then be cooled to about 25° C. and then heated at a rate of about 20° C./minute up to about 350° C. On the particular DSC above, the temperature at which endotherms occur will be given. Also, the amount of heat absorbed, in Joules/gram, at each respective endotherm will be given. The major melting point is the temperature at which the greatest amount of heat, in Joules/gram, is absorbed.

Polyacetals are usually melt processed at melt temperatures of about 170–260° C., preferably 185–240° C., most preferably 200–230° C. The non-meltable polymer stabilizer should be non-meltable at the particular temperature at which the polyacetal is melt processed.

The non-meltable polymer stabilizer must further have a number average particle size of less than 10 microns after melt processing with the polyacetal. It should also have a number average particle size of less than 10 microns before melt processing with the polyacetal. It should be understood that a high degree of loose agglomeration of particles in the non-meltable polymer stabilizer may occur during the preparation and isolation of the non-meltable polymer stabilizer, such as, for example, during the drying of the non-meltable polymer stabilizer. In order for one to obtain a true and accurate measurement of the number average particle size, prior to melt processing, for a non-meltable polymer stabilizer containing a high degree of loose agglomerates, the loose agglomerates should be broken up prior to measuring or, alternatively, they should be discounted in making said measurement. Whether or not a non-meltable polymer stabilizer contains a high degree of loose agglomerates can be determined by standard techniques of transmission electron microscopy. The details of determining the number average particle size, both before and after melt processing, are disclosed below.

The formaldehyde reactive hydroxyl groups can be incorporated into the non-meltable polymer stabilizer by using an appropriate hydroxyl containing monomer, such as, for example, hydroxyl alkyl acrylates or methacrylates. Alternatively, the formaldehyde reactive hydroxyl groups can be generated on the non-meltable polymer stabilizer by transforming another group into a hydroxyl group, such as, for example, by hydrolysis of esters or epoxides, or by reduction of carbonyl groups. Regardless of the methods by which the formaldehyde reactive hydroxyl groups are incorporated, the non-meltable polymer stabilizer prepared therefrom must be non-meltable, or capable of being made non-meltable, at the temperature at which the polyacetal is melt processed.

Similarly, the formaldehyde reactive nitrogen groups can be incorporated into the non-meltable polymer stabilizer by using an appropriate nitrogen containing monomer, such as, for example, acrylamide and methacrylamide. Preferred nitrogen containing monomers are those that result in the polymer stabilizer containing formaldehyde reactive nitrogen groups wherein there are two hydrogen atoms attached to the nitrogen. The particularly preferred monomer is acrylamide which, when polymerized, results in a polymer stabilizer having substantially all of the formaldehyde reactive nitrogen groups attached directly as a side chain of the polymer backbone or indirectly as a side chain of the polymer backbone. Alternatively, the formaldehyde reactive nitrogen groups can be generated on the non-meltable polymer stabilizer by modification of the polymer or copolymer. The formaldehyde reactive nitrogen groups may be incorporated by either method as long as the resultant polymer is non-meltable, or is capable of being made non-meltable, at the temperature at which the polyacetal is melt processed.

The quantity of the formaldehyde reactive hydroxyl or nitrogen groups in the non-meltable polymer stabilizer must be such that the atoms in the backbone to which the formaldehyde reactive groups are attached, either directly or indirectly, are separated from each other (i.e., connected to each other) by not more than twenty chain atoms. Preferably, the non-meltable polymer stabilizer will contain at least one formaldehyde reactive hydroxyl or nitrogen group per each twenty carbon atoms in the backbone of the polymer. More preferably, the ratio of formaldehyde reactive hydroxyl or nitrogen groups to carbon atoms in the backbone will be 1:2–1:10, most preferably 1:2–1:5.

The formaldehyde reactive nitrogen groups should further be present in the non-meltable polymer stabilizer such that the amount of the formaldehyde reactive nitrogen groups as, or part of, the side chains of the non-meltable polymer stabilizer backbone is at least 3 times, preferably at least ten times, the amount of the formaldehyde reactive nitrogen groups, if any, present in the backbone of the non-meltable polymer stabilizer. In other words, the formaldehyde reactive nitrogen groups, attached directly or indirectly to the atoms in the backbone of the non-meltable stabilizer, should be at least three times as great, preferably at least ten times as great, as those in the backbone of the non-meltable polymer stabilizer, if such are present. The formaldehyde reactive nitrogen groups attached directly or indirectly to the side of the polymer backbone are preferably present in a substantially greater quantity than the formaldehyde reactive nitrogen groups, if any, present in the the polymer backbone. Most preferably, nearly one hundred percent of the formaldehyde reactive nitrogen groups are attached to the sides of the polymer backbone.

The non-meltable polymer stabilizer can be a homopolymer or a copolymer, provided it is non-meltable. It is preferred that the non-meltable polymer stabilizer be polymerized from acrylamide or methacrylamide monomer by free radical polymerization and that the polymer stabilizer prepared therefrom consist of at least 75 mole percent of a unit of the form

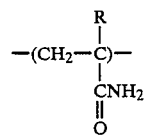

where R=hydrogen or methyl. More preferably, it consists of at least 90 mole percent of the above units, even more preferably, it consists of at least 95 mole percent of the above units, and most preferably, it consists of at least 99 mole percent of the above unit.

The non-meltable polymer stabilizer may be a copolymer in that it is polymerized from more than one monomer. The comonomer may or may not contain formaldehyde reactive nitrogen and/or formaldehyde reactive hydroxyl groups. Examples of other monomers that may be thus incorporated include styrene, ethylene, alkyl acrylates, alkyl methacrylates, N-vinylpyrrolidone, and acrylonitrile. The non-meltable polymer stabilizer that is a copolymer must still be non-meltable. It further must possess the required quantity of formaldehyde reactive hydroxyl and/or nitrogen groups, in the required ratio, and it must have the required number average particle size. The comonomer preferably should be added such that it does not unduly minimize the number of moles of formaldehyde reactive groups per gram of polymer stabilizer. Further, it should not unduly minimize the number of formaldehyde reactive sites per gram of polymer stabilizer.

Specific preferred non-meltable polymer stabilizers that are copolymeric include copolymers of hydroxypropyl methacrylate with acrylamide, methacrylamide, or dimethylaminoethyl methacrylate.

When the non-meltable polymer stabilizer has a high number of formaldehyde reactive hydroxyl groups in comparison to the number of formaldehyde reactive nitrogen groups or, alternatively, when it has only formaldehyde reactive hydroxyl groups, it may be advantageous to include other groups in the stabilizer that are basic. This is because for optimum performance as a stabilizer for polyacetal, the stabilizer should be reactive with both formaldehyde and acid. Preferably, these other groups are nitrogen containing groups, such as amines, amides, ureas, and urethanes.

The non-meltable polymer stabilizer must have a number average particle size of less than 10 microns, preferably less than 5 microns, and most preferably less than 2 microns, as measured before processing in polyacetal. Along with the polymer stabilizer being non-meltable, the number average particle size of the non-meltable polymer stabilizer is important in achieving the improved processing stability for polyacetal demonstrated herein. If the polymer stabilizer particle size is, on average, too large, then the interaction between the polyacetal and the polymer stabilizer can be negligible and the polymer stabilizer may have greatly reduced effectiveness. Stability is related to the interaction that occurs between the polyacetal and the polymer stabilizer and as such, it is desirable to have good interaction between the polyacetal and the non-meltable polymer stabilizer. Maximizing the surface area/gram of the non-meltable polymer stabilizer increases interaction between the polymer stabilizer and the polyacetal. The surface area/gram of polymer stabilizer increases as the particle size of the polymer stabilizer decreases. Thus, a non-meltable polymer stabilizer with small particle size is highly desired.

If the non-meltable polymer stabilizer particle size is, on average, on the order of 10-100 microns, then the stabilizer may impart stability to the polyacetal but the physical properties of the articles manufactured from the polyacetal may be reduced. Relatively large particles may also cause uneven surface in the articles manufactured from polyacetal containing stabilizer with large particles. In some cases, it may however be desirable to produce articles with surfaces having reduced surface gloss. In that case, a stabilizer of large particle size, more near the upper limit of the number average particle size, may actually be preferred.

The small number average particle size of the non-meltable polymer stabilizer may be obtained directly during the polymerization of the monomer or comonomers To obtain the small average particle size, the stabilizer polymerization is carried out by conventional dispersion polymerization methods in an organic media or by conventional emulsion polymerization methods in water, the techniques of each of which are well known in the art. Whether the polymerization technique is dispersion polymerization or emulsion polymerization, the non-meltable polymer stabilizer prepared therefrom should be insoluble in the polymerization media. Thus, the particular media selected for polymerization is dependent upon the particular monomer or comonomers chosen and the polymer that will result therefrom. For example, where acrylamide or methacrylamide is a monomer for polymerization, the preferred media is a lower alkyl alcohol. The polymerization may be by addition or condensation polymerization or free radical polymerization. The most preferred method is one that will result in the number of formaldehyde reactive sites in the formaldehyde reactive group being maximized. Generally, free radical polymerization is the preferred method of polymerization. Non-meltable polymer stabilizer prepared from acrylamide is most preferably prepared by free radical polymerization. In any event, the polymerization method must be such that it results in a non-meltable polymer stabilizer having formaldehyde reactive nitrogen groups or formaldehyde reactive hydroxyl groups in the quantities and amounts previously defined.

In some cases, the non-meltable polymer stabilizer produced by the polymerization to small particle size will have a sufficient major melting point or have a sufficiently low melt flow rate such that it is non-meltable as polymerized. In other cases, the polymer stabilizer may not be non-meltable as polymerized but, prior to or during the melt processing in polyacetal, it will crosslink, due to, for example, application of heat, to a sufficiently high molecular weight such that it has a low melt flow rate and is thus considered non-meltable at the temperature at which the polyacetal is melt processed. Whether the polymer stabilizer will be non-meltable as polymerized or will become non-meltable after polymerization depends upon the nature of the particular monomer or comonomers being polymerized.

In some cases, the polymer stabilizer produced by the polymerization of the monomer or comonomers will not be non-meltable as polymerized and it will not become non-meltable subsequent to polymerization. This can be easily determined by measuring the melting point or melt flow rate of the stabilizer after it has been compounded with polyacetal. In such cases, it is desirable to include at least one monomer that crosslinks the polymer stabilizer either during polymerization or at a later time. Monomers that will cause crosslinking during polymerization include polyfunctional, unsaturated monomers, such as, for example, acrylates, methacrylates, acrylamides, and methacrylamides, and derivatives thereo.f Specifically preferred monomers are ethylene glycol dimethacrylate, N,N'-methylenebisacrylamide, and 1,4-butanediol diacrylate. Monomers that may cause crosslinking after polymerization of the stabilizer polymer is complete include, for example, glycidyl methacrylate, acrylic acid, methacrylic acid, and derivatives thereof. The crosslinking monomer should be added in an amount that is sufficient to yield a polymer stabilizer that is non-meltable at the temperature at which the polyacetal is melt processed.

During the polymerization to small particle size in an organic media, with or without a crosslinking monomer, it can be advantageous to have a dispersing aid present. During the polymerization to small particle size in an emulsion, it can be advantageous to have an emulsifier present. Dispersing aids and the methods of preparing them are well known in the art. A description of the methods of making and choosing dispersing aids is included in *Dispersion Polymerization in Organic Media* (by K. E. J. Barrett, New York: John Wiley & Sons, 1975). Particularly preferred dispersing aids include polyethylene glycol and its derivatives, methyl methacrylate copolymers, and poly(oxypropylene)-poly(oxyethylene) glycol block copolymers. Emulsifiers and the method of preparing them are well known in the art. Emulsion polymerizations are discussed in *Emulsion Polymerization Theory and Practice* (by D. C. Blackley, New York: John Wiley & Sons, 1975).

The dispersant or dispersant solution or the emulsifier is added to the polymerization reaction vessel simultaneously with the monomer and polymerization medium, and, where applicable, comonomer and crosslinking monomer. When a dispersant or dispersant solution or emulsifier is added to the stabilizer, it is advantageous remove the dispersant or dispersant solution or emulsifier from the stabilizer polymer by washing the stabilizer polymer, after it is prepared, with a solvent in which the dispersant solution or dispersant or emulsifier is soluble but in which the polymer stabilizer is insoluble. This is particularly true if the dispersant or dispersant solution or emulsifier is known to destabilize polyacetal If the dispersant or dispersant solution or emulsifier is not known to destabilize polyacetal, it may be advantageous to leave it in the stabilizer polymer as it can act to reduce any agglomeration of particles that may occur during the drying of the polymer stabilizer.

Further, regarding the measurement of the melt flow rate, it is known that water and other liquids or low molecular weight solids have substantial effects on melt flow. Depending upon the technique used to isolate the non-meltable polymer stabilizer, dispersant, when used, may be retained with the stabilizer polymer. To obtain an accurate melt flow rate, the dispersant should be removed by washing the stabilizer with a liquid that is a solvent for the dispersant and is a non-solvent for the stabilizer prior to measuring the melt flow rate. After washing, the stabilizer should be redried prior to testing for melt flow rate.

The small number average particle size of the non-meltable polymer stabilizer may alternatively be obtained subsequent to the polymerization of the monomer or comonomers, while the polymer stabilizer is still in the polymerization medium or is in solution. In such cases, the small number average particle size of the stabilizer may be obtained by adding a crosslinking monomer to the polymer stabilizer in the polymerization medium, after which the stabilizer polymer becomes insoluble in the medium. Alternatively, the small number average particle size of the stabilizer may be obtained by adding a solvent in which the stabilizer polymer is insoluble to the polymer stabilizer in the polymerization medium. Similarly, the polymer stabilizer in the polymerization medium may be added to a solvent in which the polymer stabilizer is insoluble. Small number average particle size can be obtained by other known means of separating the polymer from the polymerization medium. It can be advantageous to use dispersing aids or emulsifiers such as those previously described to separate the stabilizer polymer from the polymerization medium.

Any method may be used to prepare the polymer stabilizer provided that such method will yield a polymer stabilizer having small particles, with a number average size less than 10 microns, prior to melt processing with polyacetal. Further, the small particles should be non-meltable at the temperature at which the polyacetal is melt processed and should not coalesce or agglomerate to such an extent that they are not readily dispersible in the polyacetal melt.

The number average particle size of the non-meltable polymer stabilizer before it is melt processed with polyacetal can be measured by any means capable of determining number average particle size The preferred means is the MICROTRAC II SMALL PARTICLE ANALYZER (ANALYZER), manufactured by Leeds & Northrup. By this method, the polymer stabilizer is added to a liquid, such as, for example, 2-propanol, and shaken by hand to disperse the polymer stabilizer in the liquid. In some cases, a high concentration of loose agglomerates may have occurred during the preparation of the polymer stabilizer In such cases, more intensive mixing may be desired in order to break up the loose agglomerates An example of a device capable of providing such intensive mixing is a "POLYTRON" (Brinckman Instruments) From this dispersion of non-meltable polymer stabilizer in liquid, the number average particle size for the polymer stabilizer is determined by the ANALYZER.

An example of a specific ANALYZER is the Model 158705/158708, Which is equipped with a 17 channel detector system that covers a particle size range of 0.17 to 60 microns. The ANALYZER prints the percent of particle volume that has a diameter of less than the given detector channel. From the diameter and particle volume, the number average particle size is calculated. In this calculation, the particle diameter for a given detector channel is approximated by the channel diameter. The number of particles in each channel is calculated by the following formula:

$$N = (10000 V\%)/(0.5236 d^3/6)$$

where
N = number of particles in a given channel
V% = volume of particles in that channel
d = channel diameter By summing the number of particles in all 17 channels, the total number of particles is calculated. By multiplying the number of particles in a channel by 100, and dividing the result by the total number of particles, the percent of particles in each channel is calculated. To calculate the total number percent having a diameter of less than that channel, starting with the smallest diameter channel, a cumulative number percent is calculated by adding the number percent in all channels that have a diameter less than or equal to that particular channel. From this cumulative sum of number percents, the median number average particle size is calculated.

The number average particle size of the stabilizer after it has been melt processed with polyacetal should be less than 10 microns, preferably less than 5 microns, and most preferably less than 2 microns. It can be measured by any technique capable of measuring number average particle size for particles in a polymer. The preferred method of measuring the number average particle size of the stabilizer in the polyacetal is by transmission electron microscopy.

The following illustrates how the number average particle size of the non-meltable polymer stabilizer can be determined after it has been melt-processed and formed into pellets with polyacetal. A pellet is sectioned using a Reichert-Jung Ultracut E model FC4E diamond knife microtome. Using standard −90° C. cryo-ultramicrotomy techniques, 90–120 nanometer sections of the pellet are microtomed. The microtomed sections, still on the diamond blade, are picked off the diamond blade and mounted directly onto a copper transmission electron microscopy (TEM) grid. The sections, as mounted, are placed in a Denton vacuum evaporator model D V-502 and, under high vacuum, coated with a thin layer of spectroscopically pure carbon less than 20 nanometers thick. The carbon coating gives acetal sections more stability when exposed to the electron beam inside the transmission electron microscope. The carbon coated sections on the TEM grids are then examined using a Zeiss EM10CR transmission electron microscope. Images are recorded at nominal magnifications of 1000x, 2520x, and 5000x on 70 mm (Kodak 5302) film, and printed. Magnification calibrations performed on an annual basis using a commercially available grating replica are combined with the photographic enlargement factor to give the final image magnification, which includes 4640x, 11800x, and 23000x. The number average particle size is determined from the recorded images by measuring, with a ruler, the diameter of at least 50 particles, including large particles and any particles that may have agglomerated. Agglomerated particles are treated as one particle. The number average particle size is calculated by averaging the values obtained from the at least 50 particles.

The antioxidant

The particular antioxidant used in the compositions of the present invention is amide-containing and is also phenolic. The amide may be primary, secondary, or tertiary. The phenol should be sterically hindered. As the examples below will show, an antioxidant that contains both amide and phenol functionalities imparts significantly better long term stability to polyacetal compositions containing a non-meltable polymer stabilizer than does a non-amide-containing phenolic antioxidant alone.

Amide-containing phenolic antioxidants are known in the art. Examples of amide-containing phenolic antioxidants include, but are not limited to, amides of beta-(3,5-di-tert-butyl-4-hydroxy-phenyl) propionic acid, such as, for example, 1,3,5-tris-3,5-di-tert-butyl-4-hydroxyphenyl-propionyl) hexahydro-s-triazine and N,N,-hexamethylene bis(3,5-di-tert-butyl-4-hydroxyhydrocinnamide). Amide-containing phenolic antioxidants also include 2,2'-oxalyldiamidobisethyl-3-(3,5-di-tert-butyl-4-hydroxyphenyl) propionate. The preferred amide-containing antioxidant is N,N,-hexamethylene bis(3,5-di-tertbutyl -4-hydroxyhydrocinnamide).

The improvement in the long term stability of the non-meltable polymer stabilized polyacetal composition occurs when the amide-containing phenolic antioxidant is present alone or as part of a mixture of antioxidants. The mixture can consist of more than one amide-containing phenolic antioxidant or optionally it can consist of a combination of an amide-containing phenolic antioxidant and a non-amide-containing antioxidant. In any event, there must be present in the polyacetal composition 0.02-1.0 weight percent of the amide-containing phenolic antioxidant, said weight percent being based upon the weight of the polyacetal, the non-meltable polymer stabilizer, and the amide-containing phenolic antioxidant.

The non-amide-containing antioxidants are primary, or chain terminating, antioxidants that do not contain amide functionality. These antioxidants are also frequently referred to as radical scavengers. The majority of primary antioxidants are sterically hindered phenols or secondary aromatic amines. Preferably, the non-amide-containing antioxidant is of the sterically hindered phenol type.

Examples of non-amide-containing sterically hindered phenolic antioxidants that may be added along with the amide-containing phenolic antioxidant to the composition include, but are not limited to, the following:

Simple antioxidants, such as 2,6-dialkylphenols, including, for example, 2,6-di-tert-butyl-4-methylphenol, 2-tertbutyl -4,6-dimethylphenol, 2,6-di-tert-butyl-4-methoxymethylphenol and 2,6-di-octadecyl-4-methyl phenol.

Derivatives of alkylated hydroquinones, such as for example, 2,5-di-tert-butyl-hydroquinone, 2,5-di-tert-amylhydroquinone, 2,6-di-tert-butylhydroquinone, 2,6-di-tert-butyl-4-hydroxy-anisole, 3,5-di-tert-butyl-4-hydroxy-anisole, 3,5-di-tert-butyl-4-hydroxyphenyl stearate, and bis -(3,5-di-tert-butyl-4-hydroxyphenyl) adipate.

Alkylidene-bisphenols, such as, for example, 2,2,-methylene-bis-(6 tert-butyl-4-methylphenol), 2,2,-methylene-bis-(6 tert-butyl-4-ethylphenol), 4,4,-methylene-bis-(6 tert-butyl-2-methylphenol), 4,4,-methylene-bis-(2,6-tert-butyl-phenol), 2,6-di-tert-butyl-5-methyl-2-hydroxybenzyl) 4-methylphenol, 2,2,-methylene-bis-[4-methyl-6-(4-methylcyclohexyl)-phenol], 1,1-bis-(3,5-dimethyl-2-hydroxyphenyl)-butene, 1,1-bis-(5-tert-butyl-4-hydroxy-2-methylphenyl)-butane, 2,2-bis-(3,5-di-tertbutyl -4-hydroxyphenyl)-propane, 1,1,3-tris-(5-tertbutyl -4-hydroxy-2-methylphenyl)-butane, 2,2-bis-(5-tert-butyl-4hydroxy-2-methylphenyl)-4-n -dodecylmercaptobutane, 1,1,5,5-tert-butyl-4-hydroxy-2-methylphenyl)-pentane and ethylene glycol bis [3,3-bis-(3'-tert-butyl-4'-hydroxyphenyl)-butyrate].

0- and N-benzyl compounds, such as, for example, 3,3',5,5'-tetra-tert-butyl-4,4'-dihydroxy-dibenzyl ether and tris-(3,5-di-tert-butyl-4-hydroxybenzyl)-amine.

Hydroxybenzylated malonates, such as, for example, dioctadecyl 2,2-bis-(3,5-di-tert-butyl2-hydroxybenzyl)-malonate, dioctadecyl 2-(3-tertbutyl-4-hydroxy-5-methylbenzyl)-malonate, didodecylmercapto-ethyl, 2,2-bis-(3,5-di-tert-butyl-4-hydroxybenzyl)-malonate and di-[4-(1,1,3,3-tetramethylbutyl)-phenyl] 2,2-bis-(3,5-di-tert-butyl-4-hydroxybenzyl)-malonate.

Hydroxybenzyl-aromatic compounds, such as, for example, 1,3,5-tris-(3,5-di-tert-butyl-4-hydroxybenzyl)-2,4,6-trimethylbenzene, 1,4-bis-(3,5-di-tert-butyl-4-hydroxybenzyl)-2,3,5,6-tetramethylbenzene di-tert-butyl-4-hydroxybenzyl)-2,3,5,6-tetramethylbenzene and 2,4,6-tri-(3,5-di-tert-butyl-4-hydroxybenzyl)-phenol.

s-Triazine compounds, such as, for example, 2,4,6-tris-(3,5-di-tert-butyl-4-hydroxyphenoxy)-s-triazine, 2,4,6-tris-(3,5-di-tert butyl-4-hydroxyphenylethyl)-s-triazine and 1,3,5-tris(3,5-di-tert-butyl-4-hydroxybenzyl) isocyanurate.

Esters of beta-(3,5-di-tert-butyl-4-hydroxyphenyl)-propionic acid with monohydric or polyhydric alcohols, such as, for example, with methanol, ethanol, octadecanol, 1,6-hexanediol, 1,9-nonanediol, ethylene glycol, 1,2-propanediol diethylene glycol, triethylene glycol, neopentylglycol, pentaerythritol, trimethylhexanediol, trimethylolethane, triethylolpropane, and trishydroxyethyl isocyanurate.

Esters of beta(5-tert-butyl-4-hydroxy-3-methylphenyl) propionic acid with monohydric or polyhydric alcohols, such as for example, with methanol, ethanol, octadecanol, 1,6-hexanediol, 1,9-nonanediol, ethylene glycol, 1,2-propanediol, diethylene glycol, triethylene glycol, neopentylglycol, pentaerythritol, trimethylhexane-diol, trimethyolethane, trimethylolpropane, and tris-hydroxyethyl isocyanurate.

Esters of 3,5-di-tert-butyl-4-hydroxyphenylacetic acid with monohydric or polyhydric alcohols, such as, for example, with methanol, ethanol, octadecanol, 1,6-hexanediol, 1,9-nonanediol, ethylene glycol, 1,2-propanediol, diethylene glycol, neopentylglycol, pentaerythritol, trimethylhexanediol, trimethylolethane, trimethylol- propane, and tris-hydroxyethyl isocyanurate.

Examples of non-amide-containing secondary aromatic amine antioxidants that may be added along with the amide-containing phenolic antioxidant to the composition include, but are not limited to, the following:

Diarylamines, such as N-phenyl-alpha-naphthylamine, p-oriented styrenated diphenylamine, and octylated diphenylamines.

p-Phenylenediamines, such as N,N'-diphenyl-p-phenylenediamine and N,N'-di-beta-naphthyl-p-phenylenediamine.

It is preferred that the non-amide-containing antioxidant be selected from triethylene glycol bis(3-(3'-tert-butyl4'-hydroxy-5'-methylphenyl) propionate); tetrakis(methylene(3,5-di-tert-butyl-4-hydroxyhydrocinnamate)) methane; tris(methylene(3,5-di-tert-butyl-4-hydroxyphenyl)-1,3,5-cyanuric acid; and 1-octadecanol(3,5-di-tert-butyl-4-hydroxyhydrocinnamate).

The composition

The polyacetal compositions of the present invention consist essentially of 0.05–3.0 weight percent of at least one non-meltable polymer stabilizer and 0.02–1.0 weight percent of at least one amide-containing phenolic antioxidant, and 96.0–99.9 weight percent of the polyacetal. Unless otherwise specified, all weight percentages disclosed in this paragraph are based upon the weight of the polyacetal, the non-meltable polymer stabilizer, and the amide-containing phenolic antioxidant. Preferably, it contains 0.15–1.5 weight percent, most preferably 0.2–1.0 weight percent, of the non-meltable polymer stabilizer. The amide-containing phenolic antioxidant is preferably present at 0.02–0.5 weight percent, most preferably 0.05–0.25 weight percent. Optionally, non-amide-containing phenolic antioxidant may be incorporated into the composition at 0.05–0.50 weight percent, preferably 0.05–0.25, and most preferably, 0.10–0.20 weight percent of the composition, said weight percent being based upon the weight of the polyacetal, the non-meltable polymer stabilizer, and all antioxidant types.

It should be understood that the compositions of the present invention can include, in addition to the polyacetal, the non-meltable polymer stabilizer, and the at least one amide-containing phenolic antioxidant (or mixture of amide-containing phenolic antioxidant and non-amide-containing phenolic antioxidant), other ingredients, modifiers, and additives as are generally used in polyacetal molding resins, including pigments, colorants, UV stabilizers, toughening agents, nucleating agents, and fillers. It should also be understood that some pigments, colorants, and other additives can, themselves, adversely affect the stability of polyacetal compositions. Specific examples of other additives include, but are not limited to, the following:

UV-Absorbers and light stabilizing agents include the following:

2-(2'-hydroxyphenyl)-benzotriazoles, e.g., the 5'-methyl-, 3',5'-di-tert-butyl-, 5'-tert-butyl-, 5'-(1,1,3,3-tetramethylbutyl)-, 5-chloro-3,,5'-di-tert-butyl-, 5-chloro-3'-tert-butyl-5'-methyl-, 3'-sec.-butyl-, 5'-tert-butyl-, 3'-alpha-methylbenzyl5'-methyl-, 3'-alpha-methylbenzyl-5'-methyl-5-chloro-, 4'-hydroxy-, 4'-methoxy-, 4'-octoxy-, 3,,5'-di-tert-amyl-, 3'-methyl-5,carbomethoxyethyl-, 3,,5'-bis (alpha, alpha-dimethylbenzyl)-, 3',5'-bis(alpha, alpha-dimethylbenzyl)-5-chloro-, 3,,5'-di-tert-octylphenyl-, 3',5'-di-tert-octylphenyl-5-chloro- and 5-chloro-3',5'-di-tert-amyl-derivatives; 2,4-bis (2'-hydroxyphenyl)-6-alkyl-s-triazines, e.g., the 6-ethyl-, 6-heptadecyl- or 6-undecyl-derivative. 2-hydroxybenzophenones, e.g., the 4-hydroxy-, 4-methoxy-, 4-octoxy-, 4-decyloxy-, 4-dodecyloxy-, 4-benzyloxy-, 2',4-4'-trihydroxy- or 2'-hydroxy4,4'-dimethoxy-derivative; 1,3-bis(2'-hydroxybenzoyl)benzenes, e.g. 1,3-bis-(2'-hydroxy-4'-hexloxybenzoyl)-benzene, 1,3-bis(2'-hydroxy-4'-octyloxybenzoyl)-benzene or 1,3-bis(2'-hydroxy-4'-dodecyloxybenzoyl)-benzene; Esters of optionally substituted benzoic acids, e.g., phenylisalicylate, octylphenylsalicylate, dibenzoylresorcia, bis-(4-tert-butylbenzoyl)-resorcia, benzoylresorcia, 3,5-di-tert-butyl-4-hydroxybenzoic acid-2,4-di-tert-butylphenyl ester or -octadecyl ester or -n-hexadecyl ester or -2-methyl-4,6-di-tert-butyl ester; Acrylates, e.g., alpha-cyano-beta-beta-diphenylacrylic acid-ethyl ester or iso-octyl ester, alpha-carbomethoxy-cinnamic acid methyl ester, alpha-cyano-beta-methyl-p-methoxycinnamic acid methyl ester or butyl ester or N-(betacarbomethoxyvinyl)-2-methyl-indoline; Sterically hindered amines, e.g. 4-benzoyl-2,2,6,6-tetramethylpiperidine, 4-stearyloxy-2,2,6,6-tetramethylpiperidine, bis(2,2,6,6-tetramethyl-piperidyl)sebacate or 3-n-oxtyl-7,7,9,9-tetramethyl-1,3,8triazaspiro [4,5]decane-2,4-dione; Oxalic acid diamides, e.g., 4,4'-di-oxtyloxy-oxanilide, 2,2'-didodecyloxy-5,5'-di-tert-butyl-oxanilide, 2-ethoxy-2'-ethyl-oxanilide, N,N'-bis(3-dimethyl-aminopropyl)oxalamide, 2-ethoxy-5-tert-butyl-2'-ethy1,5,4'-di-tert-butyl-oxanilide, or mixtures of ortho and paramethoxy as well as of o- and p-ethoxy-disubstituted oxanilides.

Metal deactivators, e.g., oxanilide, isophthalic acid dihydrazide, sebacic acid-bisphenylhydrazide, bis-benzylidene-oxalic acid dihydrazide, N,N'-diacetyl-adipic acid dihydrazide, N,N'-bis-salicyloyloxalic acid dihydrazide, N,N'-bid-salicylohlhydrazine, N-salicyloyl-N'-salicylalhydrazine, or 3-salicyloyl-amino-1,2,4-triazole.

Basic co-stabilizers, e.g., alkali metal salts and alkaline-earth metal salts of higher fatty acids, for example Ca-stearate, Zn-stearate, Mg-behenate, Na-ricinoleate or K-palmitate may be added for polyacetal copolymer compositions.

Nucleation agents, such as boron nitride and talc.

Still other additives that can be incorporated in the stabilized compositions are lubricants such as ethylene bis-stearamide and fillers, such as carbon black, asbestos, kaolin, talc, glass fibers, glass beads, glass flake, pigments, optical brighteners, and antistatic agents.

It is important that the non-meltable polymer stabilizer, the amide-containing phenolic antioxidant (or mixture thereof, including a mixture containing non-amide-containing phenolic antioxidant), and any other ingredient used in the compositions of the present invention be substantially free of compounds which destabilize acetal resins.

For ester-capped or partially ester-capped polyacetal homopolymer, the non-meltable polymer stabilizer, antioxidant, and any other ingredient should be substantially free of basic materials which can destabilize the polyacetal. Basic impurities should preferably be removed to levels of not more than 50 ppm and most preferably to not more than 10 ppm. In stabilizing polyacetal copolymer or homopolymer that is substantially all ether-capped, higher concentrations of basic materials can be tolerated. In addition, it should be understood that if the impurity is only weakly basic, then relatively higher amounts can be tolerated.

In stabilizing both homopolymer and copolymer polyacetal, acidic impurities in the non-meltable polymer stabilizer, antioxidant, and any other ingredient should be minimized. Acidic inpurities should preferably be removed to levels of not more than 50 ppm and most preferably to not more than 10 ppm. As with basic impurities, it should be understood that if the impurity is only weakly acidic, relatively higher amounts can be tolerated.

If acidic and/or basic impurities are present in any of the components to be added to the polyacetal in amounts large enough to cause destabilization of the polyacetal compositions, the component should be purified before it is introduced into the compositions of the present invention. For example, the non-meltable polymer stabilizers used in the compositions of the present invention can be purified by washing with an appropriate liquid, such as methanol and/or water. Non-meltable polymer stabilizers prepared with dispersants or emulsifiers that have destabilizing effects because, for example, they are highly acidic or highly basic, can be purified by washing the stabilizer with a solvent in which the dispersants or emulsifiers are soluble and in which the polymer stabilizer is insoluble.

The compositions of the present invention can be prepared by mixing the non-meltable polymer stabilizer and the amide-containing phenolic antioxidant, or a mixture of the amide-containing phenolic antioxidant with at least one other phenolic antioxidant, with the polyacetal at a temperature above the melting point of the polyacetal polymer using any intensive mixing device conventionally used in preparing thermoplastic polyacetal compositions, such as rubber mills, internal mixers such as "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating, both intermeshing and non-intermeshing. These devices can be used alone or in combination with static mixers, mixing torpedoes and/or various devices to increase internal pressure and/or the intensity of mixing, such as valves, gate or screws designed for this purpose. Extruders are preferred. Of course, such mixing should be conducted at a temperature below which significant degradation of the polyacetal will occur.

Shaped articles can be made from the compositions of the present invention using any of several common methods, including compression molding, injection molding, extrusion molding, blow molding, rotational molding, melt spinning, and thermoforming. Injection molding is preferred. Examples of shaped articles include sheet, profiles, rod stock, film, filaments, fibers, strapping, tape tubing, and pipe. Such shaped articles can be post treated by orientation, stretching, coating, annealing, painting, laminating, and plating. Such shaped articles and scrap therefrom can be ground and remolded.

Processing conditions used in the preparation of the compositions of the present invention and shaped articles made therefrom include melt temperatures of about 170-260° C., preferably 185-240° C., most preferably 200-230° C. When injection molding the compositions of the present invention, the mold temperature will generally be 10-120° C., preferably 10-100 ° C., and most preferably about 50-90° C.

EXAMPLES

In the following examples, there are shown specific embodiments of the present invention and certain comparisons with embodiments of control experiments outside the limits of the present invention. It will be seen that the compositions of the present invention are characterized by improved long term stability, evidenced by improved property retention. All temperatures are in degrees Celsius unless otherwise specified. Measurements not originally in SI units have been so converted and rounded where appropriate.

Preparation of Non-Meltable Polymer Stabilizers

In the preparation of the non-meltable polymer stabilizers described below, total polymerization time was measured from the time at which the initiator was initially charged into the reaction vessel to the time when the polymerization was completed and heat was withdrawn from the vessel. DSC measurements were made using the DUPONT Model 9900 DSC and by following the method previously described. The particle size of the non-meltable polymer stabilizer prior to melt compounding was measured on the ANALYZER, as described previously. Melt flow rates were determined in accordance with ASTM D-1238, as described above.

In the preparation of the non-meltable polymer stabilizers described below, "PEG" is polyethylene glycol, a dispersant, having a molecular weight of about 8000.

Stabilizer A was prepared by adding a solution of 52.50 grams of acrylamide and 0.53 grams of 1,4-butanediol diacrylate in methanol (78.75 grams) to a solution of 7.00 grams tert-butylperoxypivylate and 26.25 grams PEG in 802.00 grams of methanol. The resulting solution was heated to reflux (about 64° C.). When the reaction began turning milky white, two solutions, one consisting of 472.50 gams of acrylamide and 4.72 grams of 1,4-butanediol diacrylate in 708.75 grams of methanol and the other consisting of 26.25 grams of PEG in 172.50 grams methanol were added simultaneously to the refluxing reaction suspention over a period of 2 hours. Upon complete addition of the two solutions, the resulting reaction suspension was allowed to reflux an additional 2.5 hours. The reaction suspension was filtered and the resulting white solid was washed with 400 ml of methanol and dried at 55-60° C. for 6 hours.

Stabilizer B was prepared by polymerizing 298.5 grams of acrylamide, 1.5 grams of N,N'-methylenebisacrylamide, and 36 grams of PEG in 3000 ml. of 2-propanol. The polymerization reaction was started at about 72.5° C. using an initial charge of 0.15 grams of 2,2'-azobis(isobutyronitrile) free radical initiator. Additional initiator was added, in increments of 0.03 grams, over the next approximately 200 minutes until the total amount of initiator added was 0.45 grams. Approximately 20 minutes after the initial charge of initiator was added, 91 ml. of a solution of 20 grams of PEG in 100 ml. of methanol solution were fed into the reaction vessel over a period of about 180 minutes. The polymerization temperature was maintained between about 72 and 76° C. The total polymerization time was 240 minutes. The reaction mixture was cooled to 25° C., at which point 250 ml. of 2-propanol were added. The resulting polyacrylamide stabilizer dispersion was filtered in order to isolate the polymer stabilizer. The polymer stabilizer was rinsed with 1000 ml. of 2-propanol and dried in a 60° C. vacuum oven.

DSC analysis showed that the polymer stabilizer had a small endotherm of 4.98 Joules/gram at 57.4° C., attributed to polyethylene glycol. DSC analysis further showed a second endotherm of 2.6 Joules/gram at 189.6° C. The major melting point was 291.3° C., with an endotherm of 114.5 Joules/gram. The melt flow rate, in grams/10 min., was as follows: 5.16 at 6–7 minutes, 4.12 at 7–8 minutes, and 4.03 at 8–9 minutes. The stabilizer had a number average particle size of 1.4 microns.

The polymer stabilizer was washed with hot methanol to remove the polyethylene glycol dispersant and it was then redried. DSC analysis on the washed polymer stabilizer showed a small endotherm of 2.6 Joules/gram at 187.0° C. The major melting point was 295.0° C., with an endotherm of 209.5 Joules/gram. The washed polymer stabilizer showed no flow at 6–9 minutes.

Stabilizer C was prepared by adding a solution of 14.3 kg of acrylamide and 145.15 grams of 1,4-butanediol diacrylate to a refluxing solution of 1.44 kg of PEG in 48.06 kg of methanol (approximately 64° C.) over a period of about 2 hours. Throughout this addition, a total of 195.04 grams tert-butylperoxypivylate polymerization initiator was portion wise added. The resulting reaction suspension was cooled and filtered. The resulting white solid was washed with methanol and dried in a vacuum oven (6.75×10$^4$ Pa) at 70° C. for I day and at 100° C. for 1 day.

Antioxidants/Polyacetal/Other Additives used in the Examples

The non-amide-containing antioxidant used in the examples that follow are described below:

A=triethylene glycol bis(3-(3'-tert-butyl4'-hydroxy-5'-methylphenyl)propionate)
B=1.6-hexanediol bis(3,5-di-tert-butyl4-hydroxyhydrocinnamate)
C=tetrakis(methylene(3,5-di-tert-butyl4-hydroxyhydrocinnamate)) methane
D=2,2'-methylene-bis-(4-methyl-6-tertbutyl phenol)
E=4,4'-butylidene-bis-(6-tert-butyl-3methyl phenol)
F=bis(3,5-di-tert-butyl-4hydroxyhydrocinnamyl)-1,2-hydrazide
G=tris(methylene(3,5-di-tert-butyl-4-hydroxyphenyl)-1,3,4cyanuric acid
H=1-octadecanol(3,5-di-tert-butyl-4hydroxyhydrocinnamate)

The amide-containing phenolic antioxidant used in the examples that follow is described below:
AmConl=N,N'-hexamethylene bis(3,5-ditert-butyl-4-hydroxyhydrocinnamide)

Unless otherwise specified, the polyacetal used in each example was an acetate end-capped polyoxymethylene homopolymer of about 40,000 number average molecular weight.

The additives used in the examples below are as follows:

A=polyethylene glycol having a molecular weight between approximately 7000 and 9000 (sold commercially as Carbowax ® 8000by Union Carbide Company)
B=polyoxypropylene-polyoxyethylene block copolymer having an approximate molecular weight of 13000 (sold commercially as Pluronic ® F98 by BASF Wyandotte Company)

In the examples below, data were obtained on polyacetal compositions that had been compounded in an extruder and then molded into ⅛ inch thick tensile bars. Exact extrusion conditions are detailed below for each set of examples. The tensile bars of each composition were preweighed and placed in a circulating air oven at 150° C. for the times noted in each Table below. Oven location effects were averaged by distributing bars of a sample throughout the oven or by continuously rotating the bars on a carousel. At the end of the specified time period, the tensile bars were removed from the oven, weighed, and tested for tensile strength and elongation according to ASTM Method D-638 (0.2 in/min. crosshead speed). The percent weight loss was calculated as [1-(weight after aging)/(weight before aging)]×100.

PREPARATION AND EVALUATION OF POLYACETAL COMPOSITIONS CONTAINING NON-MELTABLE POLYMER STABILIZER AND AT LEAST ONE AMIDE-CONTAINING PHENOLIC ANTIOXIDANT

Example 1 and Comparative Examples C1–C6

The compositions listed in Table IA, below, were compounded on a 2-inch single screw extruder equipped with a barrier screw and a valve die (190° C. barrel settings, 50–80 rpm screw speed, 50 psi pressure). The compounded resins were injection molded into ⅛-inch thick tensile bars on a Van Dorn Model 150 RS3 6 oz. reciprocating screw injection molding machine equipped with a two-cavity mold (45/20 injection/hold cycle, 1000 psig pressure, 200° C. barrel temperature settings, 90° C. mold temperature setting). The tensile bars of each composition were placed in a circulating air oven at 150° C. for the times noted in Table IB. below. The data reported in Table IB, below, were averages of measurements performed on three tensile bars.

TABLE IA

| | Compositions | | | |
|---|---|---|---|---|
| | Wt. % Polyacetal | Wt. % Non-Meltable Polymer Stabilizer A | Antioxidant | Wt. % Antioxidant |
| Example No. | | | | |
| 1 | 99.40 | 0.50 | AmCon1 | 0.10 |
| Comparative Example No. | | | | |
| C1 | 99.40 | 0.50 | A | 0.10 |
| C2 | 99.10 | 0.50 | A | 0.40 |

TABLE IA-continued

| | Compositions | | | |
|---|---|---|---|---|
| | Wt. % Polyacetal | Wt. % Non-Meltable Polymer Stabilizer A | Anti-oxidant | Wt. % Antioxidant |
| C3 | 99.40 | 0.50 | B | 0.10 |
| C4 | 99.40 | 0.50 | C | 0.10 |
| C5 | 99.40 | 0.50 | D | 0.10 |
| C6 | 99.40 | 0.50 | E | 0.10 |

TABLE IB

Evaluation of Polyacetal Compositions in Table IA

| | Initial | Testing at 150 Degrees C. | | | |
|---|---|---|---|---|---|
| | 0 days TS/E (*/%) | 2 days TS/E/WL (*/%) | 5 days TS/E/WL (*/%/%) | 9 days TS/E/WL (*/%/%) | 16 days TS/E/WL (*/%/%) |
| Example No. | | | | | |
| 1 | 694/27 | 619/9/0.51 | 519/9/0.62 | 591/9/1.27 | 520/6/4.16 |
| Comparative Example No. | | | | | |
| C1 | 686/14 | 632/11/0.48 | 551/6/1.03 | 518/5/5.79 | 406/4/15.63 |
| C2 | 680/20 | 601/8/0.52 | 545/6/1.53 | 481/4/7.16 | 316/2/22.72 |
| C3 | 690/23 | 638/11/0.41 | 597/9/0.85 | 562/8/4.68 | 472/5/12.32 |
| C4 | 690/27 | 612/8/0.51 | 569/7/1.37 | 535/6/5.29 | 371/3/13.83 |
| C5 | 693/34 | 603/8/0.57 | 507/4/1.00 | 479/4/4.01 | Disintegrated |
| C6 | 691/23 | 581/7/0.71 | 517/5/2.26 | 372/2/9.13 | Disintegrated |

Legend
TS = tensile strength
E = elongation
WL = weight loss
* = unit for tensile strength is kg/cm²

Comparison of example 1 with comparative examples C1–C6 demonstrates the present invention. The polyacetal stabilized with a non-meltable polymer stabilizer has significantly improved long term stability when an amide-containing phenolic antioxidant, as opposed to a non-amide-containing phenolic antioxidant, is added to the polyacetal composition containing a non-meltable polymer stabilizer.

Comparison of comparative example C3 with example 1 highlights the significance of the amide functionality in achieving significantly improved long term stability. The only difference between the two compositions is that the composition of example 1 has an amide-containing antioxidant and the composition of C3 has a non-amide-containing antioxidant. More specifically, antioxidant B of C3 is exactly the same as the amide-containing antioxidant (AmConI) of example 1 except that it contains ester functionality in place of amide functionality. The structure of antioxidant B is as follows:

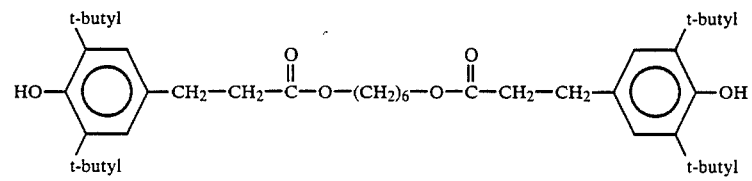

The structure of the amide-containing phenolic antioxidant AmConI is as follows:

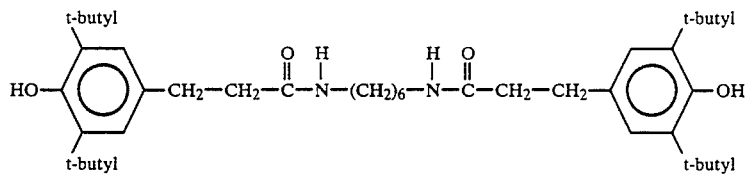

The weight loss, after 16 days, for the composition of comparative example C3, which contains the non-amide-containing phenolic antioxidant B, is about three times greater than the weight loss experienced by the composition of example 1, which contains the amide-containing compound.

Examples 2–3 and Comparative Example C7

The compositions listed in Table IIA, below, were melt compounded, extruded, and molded into tensile bars as described for example 1 and comparative examples C1–C6 The tensile bars were treated the same as in example 1 and examples C1–C6. Results reported in Table IIB, below, are based on an average of the values obtained from three tensile bars.

TABLE II

Polyacetal Compositions
Wt. % Stabilizer

| | Wt. % Polyacetal | A:B (30:70) | Antioxidant | Wt. % Antioxidant |
|---|---|---|---|---|
| Example No. | | | | |
| 2 | 99.40 | 0.50 | AmCon1 | 0.10 |
| 3 | 99.10 | 0.50 | AmCon1 | 0.40 |
| Comparative Example No. | | | | |
| C7 | 99.40 | 0.50 | A | 0.10 |

TABLE IIB

Evaluation of Polyacetal Compositions in Table IIA

| | Initial | Testing at 150 Degrees C. | | | |
|---|---|---|---|---|---|
| | 0 Days TS/E (*/%) | 2 Days TS/E/WL (*/%/%) | 5 Days TS/E/WL (*/%/%) | 9 Days TS/E/WL (*/%/%) | 16 Days TS/E/WL (*/%/%) |
| Example No. | | | | | |
| 2 | 679/26 | 657/15/0.26 | 555/9/0.63 | 576/10/0.79 | 522/3/3.64 |
| 3 | 677/25 | 597/8/0.49 | 568/8/0.45 | 552/9/1.21 | 517/5/3.31 |
| Comparative Example No. | | | | | |
| C7 | 680/25 | 619/12/0.35 | 595/11/1.05 | 542/9/4.30 | 420/2/12.38 |

Legend
TS = tensile strength
E = elongation
WL = weight loss
* = unit for tensile strength is kg/cm²

The results again show that significantly better long term stability is achieved when an amide-containing phenolic antioxidant is present in the polyacetal composition containing at least one non-meltable polymer stabilizer than when a non-amide-containing phenolic antioxidant is present. The weight loss after 16 days for a composition containing the amide-containing phenolic antioxidant was approximately four times less than that of the same composition containing a non-amide-containing phenolic antioxidant.

Examples 4–11 and Comparative Examples C8–C9

The compositions listed in Table IIIA, below, were compounded on a 2-inch single screw extruder. The nominal extruder barrel temperature was approximately 210° C. The extruded resins were injection molded into ⅛-inch thick tensile bars with an extruder temperature of approximately 207° C. and a mold temperature of approximately 88° C. The tensile bars of each composition were placed in a circulating air oven at 150° C. for the times noted in Table IIIB, below. The data, reported in Table IIIB, below, were the average of measurements performed on five tensile bars.

TABLE IIIA

Compositions Containing Mixed Antioxidant

| | Wt. % Polyacetyl | Wt. % Stabilizer C | Antioxidant | Wt. % Antioxidant | Wt. % Additive |
|---|---|---|---|---|---|
| Example No. | | | | | |
| 4 | 99.35 | 0.50 | AmCon1:A | 0.05:0.10 | — |
| 5 | 99.25 | 0.50 | AmCon1:A:G | 0:05:0.10:0.10 | — |
| 6 | 99.20 | 0.50 | AmCon1:A | 0.10:0.20 | — |
| 7 | 98.85 | 0.50 | AmCon1:A | 0.05:0.10 | 0.50A |
| 8 | 98.85 | 0.50 | AmCon1:A | 0.05:0.10 | 0.50B |
| 9 | 99.35 | 0.50 | AmCon1:H | 0.05:0.10 | — |
| 10 | 99.35 | 0.50 | AmCon1:A | 0.10:0.05 | — |
| 11 | 99.35 | 0.50 | AmCon1:C | 0.05:0.10 | — |
| Comparative Example No. | | | | | |
| C8 | 99.30 | 0.50 | A | 0.20 | — |
| C9 | 99.35 | 0.50 | F:A | 0.05:0.10 | — |

TABLE IIIB

Evaluation of Polyacetal Compositions in Table IIIA

| | Initial | Testing at 150 Degrees C | | |
|---|---|---|---|---|
| | 0 Days TS/E (*/%) | 10 Days TS/E/WL (*/%/%) | 15 Days TS/E/WL (*/%/%) | 16 Days TS/E/WL (*/%/%) |
| Example No. | | | | |
| 4 | 671/40 | 495/4/1.77 | 501/5/4.62 | — |
| 5 | 683/21 | 668/9/0.27 | — | 582/4/0.83 |
| 6 | 678/23 | 668/10/0.33 | — | 578/5/0.67 |
| 7 | 672/27 | 638/8/0.31 | — | 566/5/0.91 |
| 8 | 670/23 | 599/6/0.32 | — | 564/6/1.07 |
| 9 | 681/17 | 544/5/0.56 | — | 554/6/3.19 |
| 10 | 685/21 | 625/8/0.68 | — | 554/5/1.35 |
| 11 | 673/36 | 644/8/0.32 | — | 602/5/0.58 |
| Comparative Example No. | | | | |
| C8 | 671/37 | 488/4/5.27 | 382/3/14.21 | — |
| C9 | 680/21 | 403/4/11.26 | 305/3/20.08 | — |

Legend
TS = tensile strength
E = elongation
WL = weight loss
* = kg/cm²

Comparison of examples 4–11 with comparative examples C8–C9 further demonstrates the present invention. A comparison of example C8 with example 4 shows that when an amide-containing phenolic antioxidant is added along with a non-amide-containing phenolic antioxidant to a polyacetal composition containing a non-meltable polymer stabilizer, the retention of physical properties over time is significantly better than that of the same polyacetal composition with a non-amide-containing phenolic antioxidant alone. Comparative example C9 shows the results that are achieved when the antioxidant has a nitrogen-containing group but where the nitrogen-containing group is of a hydrazide functionality and not of an amide functionality. These results illustrate the importance of having amide functionality in the antioxidant. Examples 7–8 demonstrate an additional feature of the present invention; namely, that processing aids may be incorporated into the stabilized polyacetal composition without loss of properties. Finally, examples 4–11 show that an antioxidant mixture, which contains at least one amide-containing phenolic antioxidant, imparts better retention of properties to the non-meltable polymer stabilized polyacetal composition than does either a non-amide-containing phenolic antioxidant alone or a mixture of more than one non-amide-containing phenolic antioxidant.

We claim:

1. A thermoplastic polyacetal composition consisting essentially of
   (a) 0.05–3.0 weight percent of at least one non-meltable polymer selected from the group consisting of polymers containing formaldehyde reactive hydroxyl groups, polymers containing formaldehyde reactive nitrogen groups, and polymers containing both formaldehyde reactive hydroxyl groups and formaldehyde reactive nitrogen groups, provided that the atoms in the backbone of the polymer to which the formaldehyde reactive groups are attached, directly or indirectly, are separated from each other, on average, by not more than twenty chain atoms, and further provided that the amount of the formaldehyde reactive nitrogen groups attached, directly or indirectly, to the atoms which are in the backbone of the polymer is at least three times as great as the amount of formaldehyde reactive nitrogen groups present in the backbone of the polymer,
   (b) 0.02–1.0 weight percent of at least one amide-containing phenolic antioxidant, and
   (c) 96–99.9 weight percent of at least one polyacetal polymer,
provided that the above-stated percentages are based on the total amount of components (a), (b), and (c) only and further provided that the at least one non-meltable polymer of component (a) has a number average particle size in the composition of less than 10 microns.

2. The composition of claim 1 further comprised of 0.05–0.50 weight percent of at least one non-amide-containing antioxidant selected from the group consisting of non-amide-containing sterically hindered phenolic antioxidants and non-amide-containing secondary aromatic amide antioxidants, with said weight percent being based upon the weight of the non-meltable polymer, the polyacetal polymer, the non-amide containing antioxidant, and the amide-containing antioxidant.

3. The composition of claim 1 or 2 wherein the amide-containing phenolic antioxidant is selected from 2,2'-oxalyldiamidobisethyl3-(3-,5-di-tert-butyl-4-hydroxyphenyl) propionate and amides of beta-(3,5-di-tert-butyl-4-hydroxy-phenyl) propionic acid.

4. The composition of claim 1 or 2 wherein the amide-containing phenolic antioxidant is N,N'-hexamethylene bis(3,5-di-tert-butyl-4-hydroxyhydrocinnamide).

5. The composition of claim 2 wherein the non-amide-containing antioxidant is a sterically hindered phenolic antioxidant.

6. The composition of claim 5 wherein the sterically hindered phenolic antioxidant is selected from triethylene glycol bis(3-(3'-tert-butyl4'-hydroxy-5'-methylphenyl) propionate); tetrakis(methylene(3,5-di-tert-butyl-4-hydroxyhydrocinnamate)) methane; tris(methylene(3,5-di-tert-butyl-4-hydroxyphenyl)-1,3,5-cyanuric acid; and 1-octadecanol(3,5-di-tert-butyl-4-hydroxyhydrocinnamate).

7. The composition of claim 1 or 2 wherein the polyacetal polymer is a copolymer.

8. The composition of claim 1 or 2 wherein the polyacetal polymer is homopolymer.

9. The composition of claim 1 or 2 wherein the polymer of component (a) is polyacrylamide or polymethacrylamide.

10. The composition of claim 1 or 2 wherein the polymer of component (a) is polyacrylamide.

11. The composition of claim 1 or 2 further comprising at least one of pigments, colorants, reinforcing agents, UV stabilizers, nucleating agents, toughening agents, and fillers.

12. Shaped articles made from the composition of claim 1 or 2.

* * * * *